July 4, 1967 G. W. URSCHEL 3,329,101
MACHINE AND METHOD OF FORMING EXTRUDIBLE
MATERIAL INTO PIECES
Filed Feb. 18, 1965 2 Sheets-Sheet 1
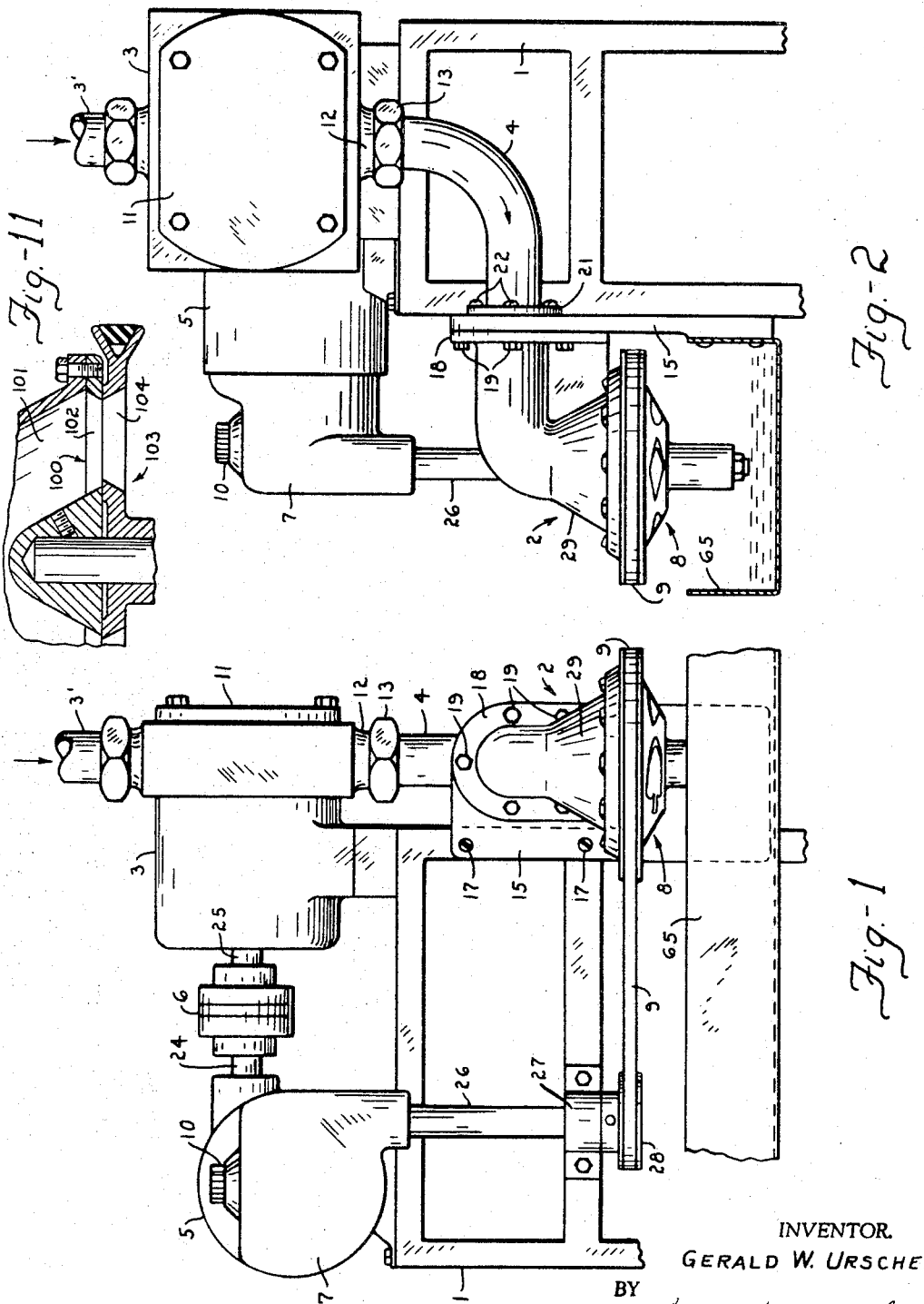
INVENTOR.
GERALD W. URSCHEL
BY
Charles S. Lonfeld
ATTORNEY July 4, 1967
G. W. URSCHEL
3,329,101
MACHINE AND METHOD OF FORMING EXTRUDIBLE
MATERIAL INTO PIECES
Filed Feb. 18, 1965
2 Sheets-Sheet 2
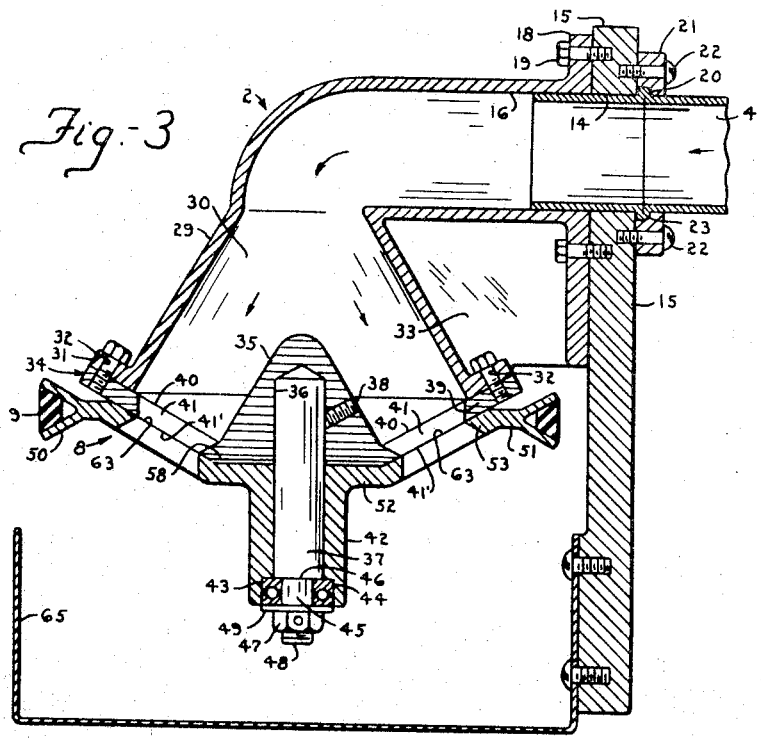
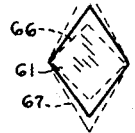
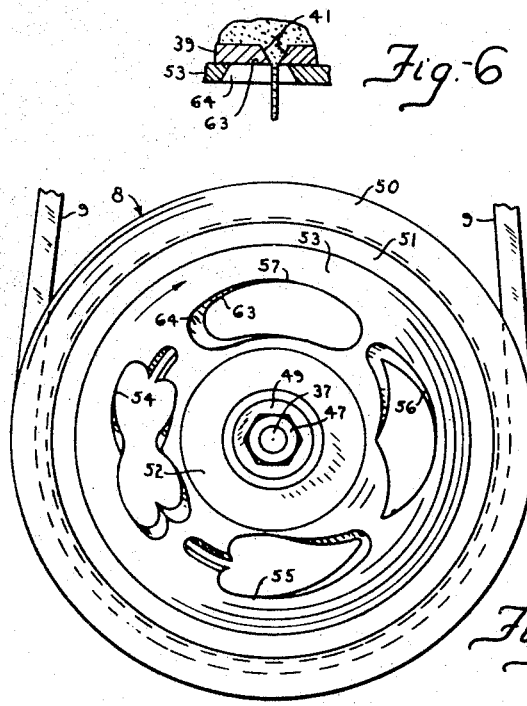
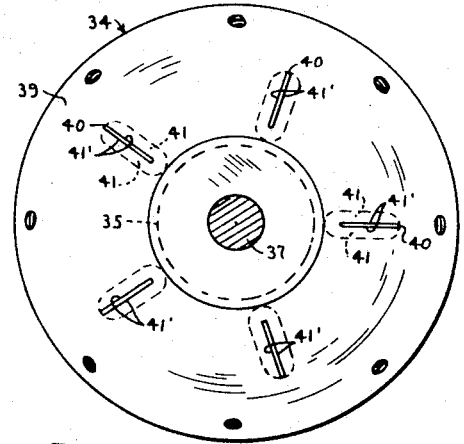
INVENTOR.
GERALD W. URSCHEL
BY
Charles S. Penfold
ATTORNEY

United States Patent Office 3,329,101
Patented July 4, 1967

3,329,101
MACHINE AND METHOD OF FORMING EX-
TRUDIBLE MATERIAL INTO PIECES
Gerald W. Urschel, 1614 Napoleon,
Valparaiso, Ind. 46383
Filed Feb. 18, 1965, Ser. No. 434,738
16 Claims. (Cl. 107—14)

This application is a continuation-in-part of my application Ser. No. 231,656, filed Oct. 19, 1962, now abandoned.

The subject invention is directed to a machine and method whereby a plastic or viscous material when extruded may be formed and separated into pieces of a predetermined shape or shapes.

One of the principal objects of the invention is to provide a machine or method whereby the product is shaped in three dimensions as distinguished from conventional machines in which the material is discharged through a fixed two dimensional opening or orifice. More particularly in this regard, provision is made in the machine embodying the subject invention for varying the size of a discharge opening as the material flows therethrough, thereby generating another dimension into the extruded material. Otherwise expressed, during a cycle of the operation the opening may be completely restricted or closed to cause separate pieces to be discharged in lieu of a continuous strip or ribbon.

An important object of the invention is to provide a machine whereby many products, which would otherwise be impracticable or impossible to shape, can be fashioned. For example, many materials having a relatively low viscosity and a high adhesive quality cannot be formed by conventional methods of rolling, cutting and the like, nor can they be handled by conventional transporting means, such as conveyors, tables and trays, due to their adhesiveness. The subject invention offers a setup whereby the product may be shaped in a thin plane perpendicular to the direction of the flow of the product and thereafter is neither touched or supported relative to a surface over which it flows during the completion of the forming and discharge from the machine. If desired, provision can be made whereby the shaped pieces will fall directly into a flowing liquid cooking bath or into a bath which will solidify or harden them, or otherwise condition them by a flame, by air, chemical treatment, etc. during their free fall from the machine. More particularly, the machine embodying the subject invention is preferably so constructed that the product as formed will be dispersed in a predetermined pattern, such as in a conical path, into a cooking bath in a manner whereby the formed pieces will fall in spaced relation to one another and not against or upon one another while in flight or into the bath.

A significant objective of the invention is to provide a machine comprising, among other things, a manifold having one or more fixed dimensional discharge openings, the size or sizes of which may be varied by a movable element or member which controls the cross-section and general profile of the pieces extruded through the opening or openings. The movable element serves to completely restrict a discharge opening for a part of a cycling operation to produce a gap between the individual extruded pieces. The length of the pieces is determined by the lineal flow of the material or mass through a discharge opening during each cycle of the element.

A particularly important object of the invention is to provide a machine with means for delivering the mass of extrudible material into a manifold or housing at a controlled rate, means for imparting movement to the movable element and with control means for synchronizing the operation of said delivery means and movement imparting means so as to produce pieces of predetermined or desired shapes.

A specific object of the invention is to provide a machine in which the control means, above referred to, enables an operator to make an adjustment to obtain any desired width to length ratio of the shaped pieces irrespective of the width to length ratio of the contour or configuration of the movable element. Length as mentioned herein refers to the axis of the flow of the material regardless of the actual shape extruded.

An additional important object of the invention is to provide a machine whereby the shape or shapes of the pieces are correlated with the shaping means on the rotatable element.

Another important object of the invention is to provide a manifold in which surfaces defining a discharge opening therein and a movable element operatively associated therewith are so designed and constructed that the material is shaped and discharged substantially simultaneously, thereby avoiding contact with any restricting surfaces after shaping.

A particular objective of the invention is to provide a machine which preferably comprises, among other things, a manifold having a chamber, a member connected to the manifold and constituting a bottom wall thereof provided with a conical hub or central portion extending into the chamber and with an inclined annular portion surrounding the hub and having circumferentially spaced discharge openings therein through which the material is extruded, and a rotatable element journalled on a shaft carried by the hub and provided with an inclined annular wall portion having openings therein which are cooperable with the openings in the member for separating and shaping into pieces the material which is extruded therethrough.

A specific object of the invention is to provide an organization whereby the peripheries of the formed pieces are substantially square or perpendicular to the generally flattened surface areas of the pieces.

Other attributes of the invention reside in providing a machine comprised of subassemblies or units and which offer advantages with respect to manufacture and assembly; high speed of production and uniformity of product; durability and low cost of maintenance.

Additional objects and advantages of the invention will become apparent after the description hereinafter set forth is considered in conjunction with the drawings annexed.

In the drawings:

FIGURE 1 is a front elevational view of the machine embodying the invention;

FIGURE 2 is an end elevational view of the machine;

FIGURE 3 is an enlarged vertical section taken through a manifold and related structure of the machine;

FIGURE 4 is a bottom view of a rotatable element operatively associated with the manifold and provided with openings;

FIGURE 5 is a bottom view of a plate or member carried by and constituting a bottom wall of the manifold and showing openings therein through which a material is adapted to be extruded and formed into pieces by the rotatable element;

FIGURE 6 is a partial transverse section showing the flow of the material through the openings in the rotatable element and plate;

FIGURES 7, 8, 9 and 10 illustrate different shapes of pieces which may be formed by the machine; and FIGURE 11 is a partial cross-sectional view of a structure generally similar to that exampified in FIGURE 3.

The machine, as exemplified in the drawings, comprises a frame 1, a manifold or housing assembly generally designated 2, a pump or pressure producing means 3 for forcing a plastic mass of material adapted to be introduced into an inlet 3' to the manifold through a conduit or pipe 4, a power unit preferably in the form of an electric motor 5 operatively connected to the pump through a coupling 6, a variable speed mechanism 7 of conventional construction operatively connected to the motor and to a rotatable generally disc-like element generally designed 8 through the agency of a belt 9 and pulleys, and a manual control 10 of conventional construction whereby the rotation of the rotatable element 8 and the operation of the pump or flow of the material can be readily synchronized so that the width to length ratio may be varied.

More particularly, as shown in FIGURES 1 and 2, the pump 3 is mounted on the frame and provided with a removable cover 11 to afford access to a conventional mechanism of the pump. The pump used in preferably of the gear type, corresponding to or similar to those used by the baking industry. The lower part of the pump is provided with a tubular fitting 12 and the end of the conduit 4 is detachably connected thereto by a union 13. The opposite end of the conduit, as shown in FIGURE 3, is adapted to extend through an aperture 14 in a bracket 15 and into an entrance or receiving end 16 of the manifold. The diameters of the aperture and entrance are substantially identical so as to properly slidably accommodate the conduit. The bracket is attached to the frame by screws 17, or equivalent means, and an arch-shaped flange 18 on the manifold is preferably connected in abutting relation against one side of the bracket by screws 19 which project through holes in the flange and engage tapped holes in the bracket. The conduit is preferably provided with an annular external bead 20 which is held against the opposite side of the bracket by a collar 21, with screws 22 extending therethrough into tapped holes provided in the bracket. The collar is preferably provided with a rabbet 23 which receives the bead.

The motor 5 and pump 3 can be connected by the couplig 6 or by any other means suitable for the purpose. The coupling 6 is of a conventional character and operatively connects an output shaft 24 of the motor with an input shaft 25 of the pump.

The motor 5 and variable speed mechanism 7 are preferably of a combined conventional type and mounted on the frame in spaced relation to the pump. The mechanism 7 is provided with a drive shaft 26 stabilized by a bearing 27 on the frame. A pulley 28 is fixed on the shaft for rotation therewith and is connected to the belt 9.

The manifold or housing assembly 2 will now be described. This assembly may be designed and constructed in various ways but, as exemplified herein, includes the tubular entrance end 16 and the flange 18, above referred to, including a frusto-conical portion 29 forming a chamber 30, and an outwardly extending annular flange 31 disposed at an oblique angle with reference to the vertical or longitudinal axis of the chamber 30. The flange 31 is provided with circumferentially spaced holes 32. The frusto-conical portion 29 is preferably reenforced by a vertical web 33 joining this portion with the flange 18.

A member or disc-like plate, generally designated 34, is detachably secured to the manifold housing to constitute a bottom wall thereof. This member is preferably formed to provide a central conical portion 35 extending into the chamber 30 so that material flowing under pressure through the entrance 16 and chamber will be parted or divided for divergent flow in directions disposed at oblique angles with reference to the vertical axis of the manifold as depicted by the lowermost arrows in FIGURE 3. The conical portion or hub 35, in combination with the frusto-conical portion 29 of the housing, form what may be termed a conical or tapered annular passage disposed in concentric relation to the vertical axis of the manifold. The conical portion of the member is preferably provided with a cylindrical axial bore 36 within which the upper end of a shaft 37 is stationarily secured by a set screw 38. The rotatable element 8, which will be described more in detail later, is journalled on the shaft 37.

The member 34 is also formed to provide an annular portion 39 surrounding the conical portion 35 and disposed at an oblique angle with reference to the vertical axis of the manifold. The peripheral portion of the portion 39 is detachably held against the flange 31 of the manifold housing by screws which extend through the apertures 32 in this flange and threadedly connect with tapped holes provided therefor in such peripheral portion.

The annular portion 39 is preferably provided with a plurality of preferably five corresponding circumferentially spaced radially extending narrow slots 40, the inner ends of which terminate adjacent the central portion 35 and their outer ends at spaced locations inset equally from the periphery of the member as exemplified in FIGURES 5 and 6. The portion 39 may also be provided with converging surfaces 41 which serve to assist in piloting the material and defining relatively sharp edges 41'.

The rotatable element generally designated 8 and its operative relationship with the member 34 will now be described. This element serves to control and vary the width or size of the openings 40 in the member in a manner whereby to separate and shape the material into pieces at the points or locations of extrusion. This element may be designed and constructed in various ways but as disclosed herein is formed to include a cylindrical tubular hub 42 having a bore therein which rotatably receives the stationary shaft 37 carried by the member 34. The lower end of the hub 42, as evidenced in FIGURE 3, is preferably recessed at 43 and receives a ball bearing assembly 44 which embraces a reduced cylindrical portion 45 of the shaft and engages a shoulder 46 thereon. A nut 47 is connected to a threaded portion 48 of the shaft and bears against a washer 49 which in turn engages the bearing assembly 44. With this setup the rotatable element is detachably mounted for rotation relative to the member 34, through the agency of the belt 9, which engages an annular V-shaped formation 50 provided on the element. This formation is relatively large in diameter and surrounds the member 34. The formation extends from an outer annular flange 51 and is preferably located at an appropriate elevation to effectively cooperate with the member 34 when rotated at the desired speed relative thereto by the belt which connects the element with the pulley 28 on the drive shaft 26 of the mechanism 7.

The rotatable element also includes an inner annular radial flange 52 adjacent the upper end of the hub 42 and this flange and the flange 51 are joined by a conical or inclined annular portion 53 provided with a plurality of circumferentially spaced shaping means, preferably in the form of openings 54, 55, 56 and 57. It will be observed in FIGURE 3, that the inclined portion 53 mates and intimately slides against the external surface of the member 34 and in order to insure an efficient rotary sliding engagement a gap 58 is preferably provided between the lower surface of the conical portion 35 of the member 34 and the upper surface of the inner radial flange 52 or upper part of the bearing 42 of the element.

The openings 54, 55, 56 and 57 provided in the rotatable element, as shown in FIGURE 4, are so designed and constructed that they will form from the material extruded through the slots 40, pieces respectively corresponding to a club 59 in FIGURE 7, a spade 60 as depicted in FIGURE 8, a diamond 61 as in FIGURE 10, and a round piece 62 as in FIGURE 9, when the element is rotated relative to the member in a clockwise direction as indicated by the arrows in FIGURE 4. It will be observed that each of the openings in the element is preferably formed to provide an inner continuous relatively sharp edge 63 which slides relative to the relatively sharp edges 41' defining the radial slots or openings in the member 34. In order to insure an efficient forming action on the material extruded through the openings or slots 40, the openings 54, 55, 56 and 57, which also receive the pieces, are provided with beveled divergent clearance surfaces 64 as depicted in FIGURES 3, 4 and 6 so that the pieces as formed will be free to directly fall, for example, into a bath of cooking oil in a container 65 located beneath the manifold as shown in FIGURES 1, 2 and 3. More particularly, the operation is preferably such that the rotatable element successively and variably covers opposite ends of the openings, while allowing the material to flow through the uncovered portions of the openings whereby to shape the material during such flow. When the openings are successively fully covered, the material is automatically separated into pieces. The surfaces 64 and the surfaces 41 of the element and member 34 may be coated with a polytetrafluoroethylene polymer such as Teflon to reduce frictional resistance to the flow of material. With this organization, the flow of the pieces as formed is not interrupted by any guide or conveyor. Due to the juxtaposed conical portions of the member and element the pieces of the product are disposed in a conical path or pattern in order to promote their separation. This factor is particularly important in those instances where a material having a high viscosity or adhesiveness is run through the machine. The container or trough 65, which is adapted to contain a quantity of flowing oil, may be attached to the frame 1 and/or bracket 15 and provided with a suitable inlet and outlet (not shown). If found desirable, means other than a cooking oil may be utilized to condition the pieces as they are expelled or discharged freely from the manifold. For example, they may be treated by any one of the various means alluded to above in the objects of the invention.

It is to be understood that the openings 40 in the member 34 and the openings 54, 55, 56 and 57 in the rotatable element 8 may be fashioned or constructed otherwise than exemplified in the drawings to produce pieces having shapes different than those illustrated in FIGURES 7 through 10.

By utilizing the manual control 10 the sizes or shapes of the resultant product or pieces may be varied. For example, if the control is manipulated to one position to reduce the speed of separating the pieces from the material being extruded the resultant pieces shown in FIGURES 7 through 10 will be longer and when the speed of separation is increased the length of the pieces will be shorter. More specifically in this respect and by way of example, a diamond piece of shorter length indicated by the dotted lines 66 in FIGURE 10 has been formed by increasing the speed of separation or forming and a diamond piece 67 of greater length than that of 61 and 66 is formed by decreasing the speed of separation. Thus, and as alluded to above, an operator can adjust the machine to obtain any desired width to length ratio of the shaped pieces irrespective of the width to length ratio of the contour or configuration of the shaping or forming means on the rotatable element.

Attention is also directed to the fact that due to the character and operative relationship of the product forming or shaping means 54, 55, 56 and 57 on the rotatable element with respect to the openings or slots 40 in the member 34 the peripheries or edges of the formed product are substantially square or perpendicular to generally flattened areas thereof.

Of further significance is the fact that radially spaced circumferentialy extending portions of each of the product shaping means cooperate to vary the size of the openings 40. Thus, a pair of product shaping means or surfaces serve to shape and separate into pieces the material being extruded. In other words, there is a definite correlation between the shape, shapes or contours of the shaping means and the shape or shapes of the resultant product.

The modified structure shown in FIGURE 11 primarily differs from that illustrated in FIGURE 3 to the extent that a planar plate 100 is carried by a manifold 101, as distinguished from the plate being generally conical. The plate 100 may be provided with a plurality of circumferentially spaced openings or slots of any shape or shapes desired, such as an elongate slot 102 of which one is shown. This modified structure also includes external rotatable means or an element 103 which substantialy corresponds to the rotatable element 8 except that it is planar and provided with a plurality of circumferentially spaced openings or slots 104 which may be of any desired shape or shapes. Otherwise expressed, the plate 100 or manifold is provided with one or more planar portions provided with one or more openings of any desired shape or shapes and rotatable means which may include one or more planar portions provided with one or more openings of any desired shape or shapes which serve to shape and divide the material into pieces during its extrusion through the openings in the plate.

Having thus described my invention, it is obvious that various modifications may be made in the same without departing from the spirit of the invention and, therefore, I do not wish to be understood as limiting myself to the exact forms, constructions, arrangements, and combinations of parts herein shown and described.

I claim:

1. A machine of the kind described comprising a pump having an inlet for receiving a plastic material and also an outlet, a housing remote from said pump having an inlet and an end wall provided with a central portion and an annular portion surrounding said central portion provided with circumferentially spaced openings, means communicatively connecting said outlet and said last mentioned inlet so that operation of said pump will extrude the material through said openings, a shaft carried by said central portion, and a disc-like element mounted on said shaft and rotatable about its axis externally of said central portion and having a portion surrounding said central portion provided with circumferentially spaced openings having configurations different from said first-mentioned openings and registerable with the latter for receiving the material and separating it into thin pieces when extruded, means for operating said pump for continuously supplying material to said housing, and means for operating said element.

2. In combination: a housing constructed to form an inlet, a chamber communicating with said inlet and having an open bottom, a member secured to said housing and closing said open bottom, said member being provided with a central portion and an annular portion surrounding said central portion provided with a plurality of circumferentially spaced openings through which a plastic mass of material introduced into said chamber through said inlet is extruded, a disc-like element, means supporting said element below said central portion for rotation in only one direction and said element being provided with a plurality of circumferentially spaced means, having configurations different from said openings and which upon rotation serve to simultaneously shape external surfaces of the material in a plan perpendicular to its flow and means to separate into pieces the material as it is extruded through said openings.

3. A subassembly for the purpose described comprising a member and generally disc-like element, said member being provided with means for attaching it to a housing of a manifold structure to constitute an end wall thereof, said member also being provided with a central hub portion supporting a shaft and with an annular portion surrounding said hub portion provided with circumferentially spaced openings, said element being secured to said shaft for rotation about its axis in only one direction thereon externally of said member and provided with an annular portion having circumferentially spaced means having configurations different from that of said openings and being cooperable therewith for shaping and separating into thin pieces a plastic mass of material adapted for flow in a direction toward said member and for extrusion through said openings, and an annular offset formation provided on said element disposed in spaced relation to said member and surrounding said spaced means whereby to facilitate connection of said formation with means for rotating said element about the axis of said shaft.

4. A machine comprising a manifold having a conical end wall provided with circumferentially spaced openings having axes converging toward a common center, means located externally of said manifold for forcing a plastic mass of material into the manifold for movement generally axially through said manifold and said openings, and an annular generally disc-like element having a conical wall arranged in juxtaposed rotative relation to said end wall and provided with circumferentially spaced means having a configuration different from that of said openings for receiving and forming the material extruded through said openings by said forcing means.

5. The machine defined in claim 4, in which said first mentioned wall is detachable, and including means operable independently of said forcing means for rotating said element.

6. An element for use in forming an extrudible mass of plastic material into pieces, said element being generally disc-like in shape and having an annular central portion provided with means for facilitating its connection to a fixed shaft for rotation about its axis, said element also having a conical wall surrounding said central portion which is provided with means for receiving and forming the material for ejection in a conical arrangement when extruded, and said wall having a peripheral portion for operative connection with a driving means, said peripheral portion having a diameter greater than that of said central portion.

7. A machine comprising a manifold for freely receiving a plastic material and having a stationary wall with a substantially annular portion provided with an elongate radial slot through which the material is adapted to be extruded, means located externally of said manifold for applying constant pressure to the material and thereby extruding it through said slot, a rotatable disc-like element disposed externally of and operatively associated with said wall and having an annular portion provided with a pair of radially spaced circumferentially extending shaping means having configurations different from said slot for shaping the extrudible material, and means for separating into pieces the plastic material when extruded through said slot.

8. A method of forming a plastic mass of material into pieces which comprises the steps of continuously forcing and extruding the material through an elongated aperture provided in a wall of a housing and ratating a generally disc-like element externally of the housing and independently of the force in close relation to the aperture so that portions of the element different from the aperture will successively variably cover its opposite ends while allowing the material to flow through the aperture to shape the material during such flow, and successively covering the exit side of the aperture to separate the material into pieces.

9. A method of forming a plastic means of material which comprises maintaining the material under continuous pressure to extrude it through a slot of a housing in a predetermined direction and rotating a generally disc-like element in only one direction in a plane transverse to such direction and externally of said slot so that portions of the element having configurations different from that of the slot will move toward and away from the center of the slot for varying the size of the slot while allowing the material to flow therethrough to vary the shape of the material and successively covering the slot to separate the material into pieces at the exit side of of slot as it is extruded.

10. A method of forming a plastic mass of material which comprises maintaining the material under continuous pressure in a housing to extrude it through an elongate aperture provided therein and rotating only a single element having a pair of spaced shaping means in close external relation to the aperture for successively covering the ends of the aperture to vary the length of the aperture while allowing the material to flow therethrough to shape the material in a direction transverse to its flow, and successively covering the aperture to separate the material into pieces for entry into the atmosphere as it is extruded at the exit side of the aperture.

11. A machine of the kind described comprising a housing provided with an elongate radial slot through which a plastic mass of material is adapted to be extruded, means for continuously forcing the material into the housing for discharge through said opening, a rotatable disclike element disposed externally of said housing and provided with an opening larger than said slot and having edges cooperable with said slot for substantially successively variably covering opposite ends of said slot while allowing the material to flow through the uncovered portion of the slot to shape the material by said edges during such flow and separate it into pieces for entrance in the atmosphere, means operable independently of said forcing means for rotating said element, and means for synchronizing the operation of said rotating means and said forcing means.

12. A machine of the kind described consisting of a housing for receiving a product, said housing having a wall provided with a slot, means for extruding such a product through said slot, and only a single movable element disposed in close juxtaposed external relation to said slot and having portions movable toward the center of said slot for varying its length whereby to vary the shape of the product in a plane substantially perpendicular to its direction of flow through said slot, said element also serving to cover said slot at its exit side whereby to sever the product into pieces as it is being extruded.

13. A machine comprising a manifold for freely receiving a plastic material and having a stationary wall with a substantially annular portion provided with an elongate aperture through which the material is adapted to be extruded, means located externally of said manifold for applying constant pressure to the material, a rotatable disc-like element disposed externally of and operatively associated with said wall and having an annular portion provided with an opening larger than the aperture and having edges for variably covering the ends of said aperture and thereby varying its length for shaping the plastic material during its extrusion through said aperture, and means for closing said aperture and thereby separating into a piece the shaped plastic material extruded through said aperture at its exit side.

14. A machine consisting of a manifold for receiving a plastic material, said manifold having a stationary wall provided with an elongate aperture through which the material is adapted to be extruded, only a single rotatable element disposed externally of said manifold in close relation to said stationary wall, said element including a pair of spaced shaping means having configurations different from said aperture movable forward and away from center of said aperture for covering and uncovering its ends for shaping material during its extrusion through said aperture, and means serving to completely close the exit side of said aperture to separate the shaped material into pieces.

15. A machine consisting of a manifold for receiving a plastic material and having a stationary wall, said stationary wall having a substantially planar portion provided with an elongate radial slot through which the material is adapted to be extruded, means for forcing the material into said manifold and through said slot, only a single rotatable element disposed externally of said manifold and having a planar portion provided with a pair of circumferentially spaced shaping means having configurations different from said slot arranged in close relation to said first-mentioned planar portion for covering and uncovering the ends of said slot for shaping the material during its extrusion therethrough, and means serving to periodically close said slot at its exit side for severing the shaped material into pieces.

16. The machine defined in claim 15, in which said pair of shaping means comprises a pair of spaced circumferentially extending portions of an elongate opening.

References Cited

UNITED STATES PATENTS

| | | | |
|---|---|---|---|
| 826,442 | 7/1906 | Orr | 107—14.4 |
| 2,775,788 | 1/1957 | Andrew | 107—14 |
| 2,981,211 | 4/1961 | Emerzian | 107—14 |
| 3,255,715 | 6/1966 | Urschel | 107—14 |

FOREIGN PATENTS 21,110   2/1911   Norway.

WALTER A. SCHEEL, *Primary Examiner.*

J. SHEA, *Assistant Examiner.*